Oct. 19, 1937.   W. J. KERR ET AL   2,096,182
COMPOSITE CAM FOR CYCLE CONTROLLERS
Filed Jan. 16, 1936   2 Sheets-Sheet 1
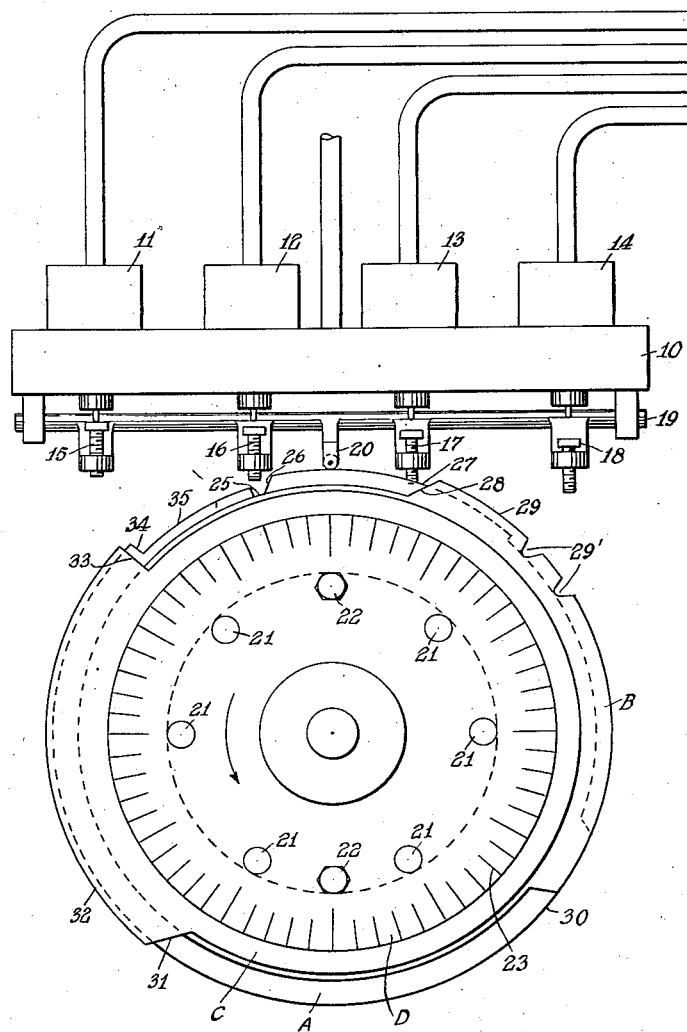
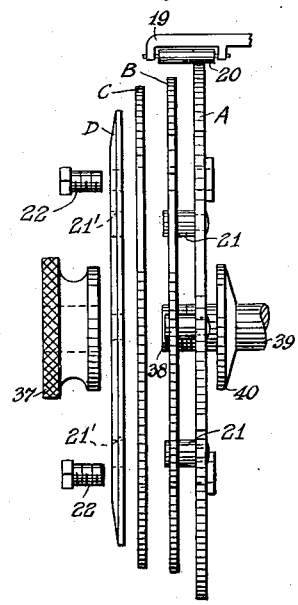
INVENTORS
WILLIAM J. KERR AND CHARLES WEBBER
BY
ATTORNEY.

Oct. 19, 1937.  W. J. KERR ET AL  2,096,182
COMPOSITE CAM FOR CYCLE CONTROLLERS
Filed Jan. 16, 1936  2 Sheets-Sheet 2
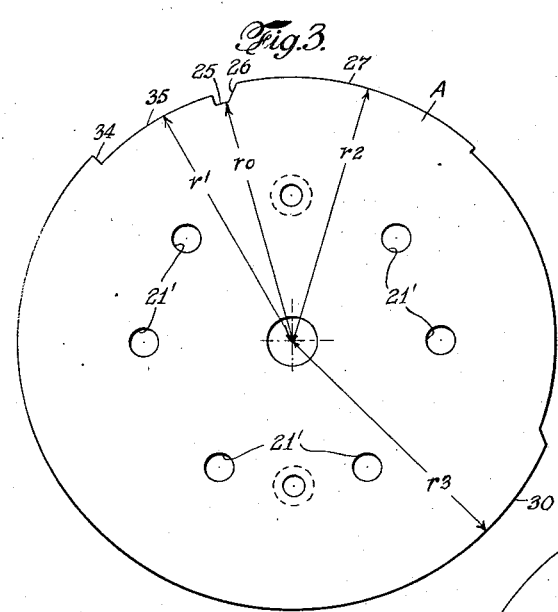
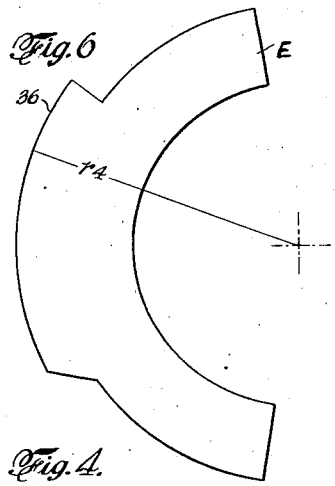
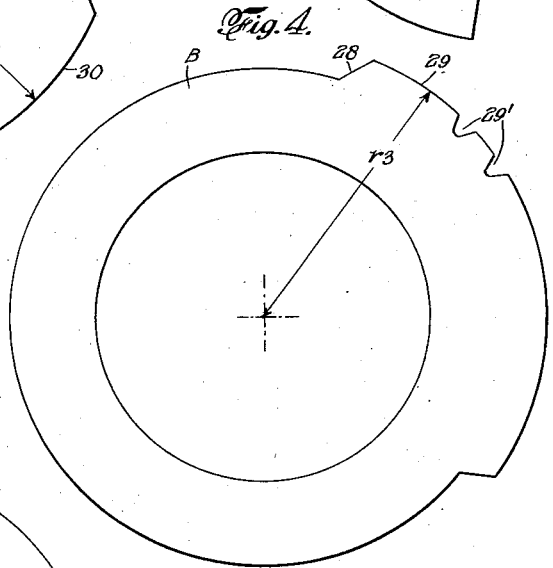
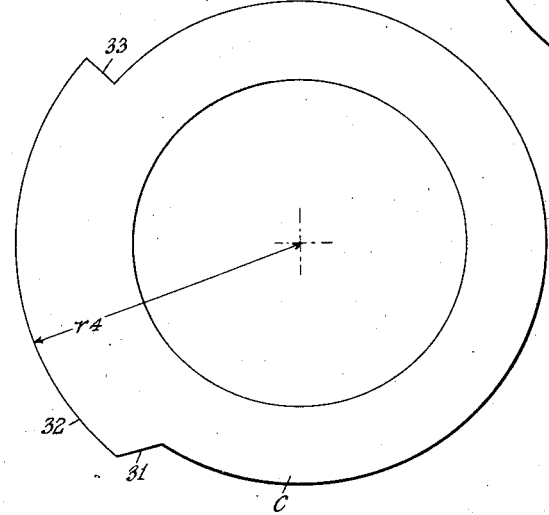
INVENTORS
WILLIAM J. KERR AND CHARLES WEBBER
BY
ATTORNEY.

Patented Oct. 19, 1937

2,096,182

UNITED STATES PATENT OFFICE 2,096,182

COMPOSITE CAM FOR CYCLE CONTROLLERS

William J. Kerr, Waterbury, Conn., and Charles Webber, Hohokus, N. J., assignors to The Bristol Company, Waterbury, Conn., a corporation of Connecticut Application January 16, 1936, Serial No. 59,416

6 Claims. (Cl. 74—568)

The invention relates to a unit cam member having peripheral portions of different radii designed for cooperation with a single follower, various events in a cycle being controlled by a plurality of tappet members of different effective lengths jointly actuated by the single follower, and serving to initiate or terminate events in the cycle according to the radius of the portion of the cam engaged by the follower.

In controllers of this type, having a fixed time period of revolution of the cam, it is customary to form the contour of the cam in a manner to include radii corresponding to the principal events of the cycle upon a single cam member, and in some cases to provide one or more adjustable sectors, held to the driving hub by the same screw as retains the main cam in place, and adjustable only by loosening the cam upon its hub.

The present invention has for an object the provision of a unit cam member embodying a plurality of adjustable sectors individually adjustable with respect to the follower, together with a graduated member whereby the extent of adjustment may be accurately determined.

Another object of the invention resides in the provision of a graduated member whereby proper adjustment of the sectors may be readily effected in the field with a minimum of interruption to the normal cycle of operations; and which member, moreover, is arranged in fixed angular relationship to an element of the cam and is adapted to clamp together the adjustable sectors.

A further object of the invention resides in novel features of construction of the unit cam member whereby the individual elements thereof are readily assembled and the member as a whole conveniently and effectively clamped to a rotatable shaft for operating the unit cam member.

In carrying out the invention, a base cam is provided with means for rotatably mounting a plurality of coaxial cam sectors to be angularly adjustable thereon, there being provided also over the sectors a graduated disk for determining the degree of adjustment. The sectors as well as the disk, for example, are arranged to be fixedly secured one upon another to the base cam to constitute a unit cam member cooperating with a single follower, and provision made for clamping this member to a cam shaft for rotating the cam, as in holding said unit cam member between an abutment of the shaft and a nut or hub cap having threaded engagement with the end of the shaft.

The nature of the invention, however, will best be understood when described in connection with the accompanying drawings, in which:

Fig. 1 is a front elevation of the novel unit cam member as associated with a single follower and control means actuated thereby.

Fig. 2 is an exploded view, in side elevation, of the unit cam member and of the follower with which it is designed to cooperate.

Figs. 3, 4 and 5 are front elevations of the base cam and associated cam sectors; and Fig. 6 of a modified form of cam sector.

Referring to the drawings, the invention is shown as embodied in a four-valve cycle controller operating from a single cam unit through a single follower, the controller valves operating in the usual manner for the admission of air or other fluid to responsive devices which, in turn, effect the various operations in the cycle of events. No claim is made to the operation of the controller device which is of the conventional type, the invention being concerned more especially with the construction of the unit cam member as cooperating with a single follower of the controller mechanism.

This latter mechanism is indicated as comprising, for example, a common manifold 10 on which are mounted four valves 11, 12, 13 and 14, preferably of the type set forth in U. S. Patent #1,890,494 of December 13, 1932, the valves being actuated by tappets 15, 16, 17 and 18, respectively. These are carried on a rocker arm 19 which is positioned about its axis by follower 20 resting on the periphery of the unit cam member hereinafter more fully described. The actuation of the follower by the unit cam member is well understood and constitutes no part of the present invention.

The novel cam unit member is shown as made up of three active sections, a base plate A, an annular sector B and an annular sector C, having parts of their respective peripheries of different radii as indicated. The radii are so proportioned to the adjustments of the valves that with the follower resting on $r_0$, all the valves are closed; with the follower on $r_1$, valve 11 is open; with the follower on $r_2$, valves 11 and 12 are both open, and so on, until with the follower on radius $r_4$ all the valves are open.

The base plate A carries a series of studs or pins 21 arranged concentrically with the cam, their outer edges forming a circular support for the sectors B and C, which thus may be rotated to any desired position upon them. A clamping disk D has in it a number of openings 21' arranged to engage the pins 21; and by irregularly spacing both pins and holes, as shown, the disk can occupy only one angular position relative to the base cam. Bolts 22, threaded into the base cam, are designed to pass through the plate and within the annular sectors B and C, and, when tightened, serve to clamp the disk, the sectors and the base cam into a unit. Time graduations 23 on the disk D, which can occupy only one position relative to the base cam, serve to provide a scale of reference by which the initiation and termination of the several events represented by the operation of the valves can be set to definite timings through the specific locations of the said sectors with reference to the base plate A.

The operation of the novel cam unit through a complete cycle is as follows:

With the follower 20 resting in the indentation 25 of the base cam A, having a radius $r_0$, all the pilot valves will be closed. When the cycle is initiated, the cam is rotated in the direction shown by the arrow, and the step 26 of the base cam A at once engages the cam follower, lifting it to the portion 27, which has a radius $r_2$. This effects the opening, first of the valve 11, and later along said step of the valve 12. As step 28 of cam sector B engages the follower 20, the follower rises to portion 29, having a radius $r_3$, actuating valve 13. After the lapse of a time determined by experiment, and established by the forming of indentations 29' on the cam face, the valve 14 is momentarily closed one or more times; and this "bumping" operation is repeated as often as necessary, after which the follower returns to radius $r_3$. As the cam rotates further, the follower passes from the portion 29 of cam B to portion 30 of cam A, the radius remaining unchanged; and the particular control continues until the step 31 of cam C is engaged, and the follower rises to portion 32, having a radius $r_4$, which actuates pilot valve 14. This control continues until the follower reaches the step 33 on the sector C and the step 34 on the base cam A, which may or may not be coincident, when valves 14, 13 and 12 are closed, the controller continuing to run, with the follower resting on portion 35 of cam A, of radius $r_1$, until the indentation 25 is engaged, the valve 11 closed and the controller motor (not shown) brought to rest, thus terminating the cycle.

By adjusting the angular positions of the cam sector B, relative to the base cam, it is possible to vary the period of actuation of the valve 13; and by reversing this sector it is possible to change the time in the cycle when the "bumps" occur, or, by positioning the indentations 29' so that they will be bridged by the portion 30 of the base cam, to eliminate this feature of the cycle entirely. By adjusting the angular position of the sector C in relation to the base cam, the time of opening of valve 14 may be controlled. Also, by making each of the sectors B and C of two parts, one controlling the initiation and the other the termination, of an event in the cycle and by adjusting the relative angular positions of the parts, it will be possible to control the duration of the respective events; and it will be obvious that many other combinations may be introduced by the selection and positioning of cam sectors of different peripheral characteristics.

Moreover, one or more of the cam sectors may be constructed so as to be readily removable from the remaining ones as by merely loosening the clamping means or bolts 22. Thus, as indicated in Fig. 6, an annular member E with camming portion 36 of radius $r_4$, similar to the sector C, is provided to extend over an arc of less than 180°. This makes it possible to remove or insert a sector or camming section quickly in case it were desired to make a temporary change in the cycle, as it is not required to dismount the cam unit from its driving shaft.

The length of the pins 21 and the bolts 22 are made such that provision may be made for a different number of sectors, as the cycle may require; and the graduations 23 on the clamping ring D provide a ready means of determining the relative times of the respective events.

With a cam as thus constructed, it is possible for the supervisor to have several distinct assemblies; and, while operating one, to make up another, which may be handled as a unit and quickly installed on the cycle controller without disturbing adjustments or requiring to make careful measurements in sometimes inaccessible locations.

A nut 37 fitting the threaded outer end 38 of cam shaft 39 serves to mount a unit thereon as by forcing the same against an abutment 40 provided on said shaft.

We claim:

1. Cam mechanism for cycle controllers, comprising a base cam with peripheral portions of different radii adapted to engage a single follower member for control of different events in a cycle and having studs projecting laterally from one face circularly disposed thereon, and a shaft for rotating said cam; a plurality of annular cam sectors supported over said studs and having peripheral portions for engaging the follower; and means to secure the sectors to the base cam in adjusted positions one upon another to constitute a unit cam member.

2. Cam mechanism for cycle controllers, comprising a base cam with peripheral portions of different radii adapted to engage a single follower member for control of different events in a cycle and having studs projecting laterally from one face, circularly disposed and irregularly spaced thereon, and a shaft for rotating said cam; a plurality of annular cam sectors supported over said studs and having peripheral portions; and a disk overlying the said cam sectors perforated to fit the pins and provided along its circumference with time graduations for cooperation with said adjacently disposed cam sectors.

3. Cam mechanism for cycle controllers, comprising a base cam with peripheral portions of different radii adapted to engage a single follower member for control of different events in a cycle and having studs projecting laterally from one face, circularly disposed and irregularly spaced thereon, and a shaft for rotating said cam; a plurality of annular cam sectors supported over said studs and having peripheral portions; a disk overlying the said cam sectors perforated to fit the pins and provided along its circumference with time graduations for cooperation with said adjacently disposed cam sectors; and bolts passing through the disk and within the sectors to secure to the base cam the latter and graduated disk one upon the other to constitute a unit cam member.

4. Cam mechanism for cycle controllers, comprising a base cam with peripheral portions of different radii adapted to engage a single follower member for control of different events in a cycle and having studs projecting laterally from one face, circularly disposed and irregularly spaced thereon, and a shaft for rotating said cam and provided with an abutment; a plurality of annular cam sectors supported over said pins and having peripheral portions; a disk overlying the said cam sectors, perforated to fit the pins and provided along its circumference with time graduations for cooperation with said adjacently disposed cam sectors; and bolts passing through the disk and within the sectors to secure to the base cam the latter and graduated disk one upon the other to constitute a unit cam member, together with a clamping nut having threaded engagement with the end of the shaft for clamping the unit cam member to the said abutment of the shaft.

5. Cam mechanism for cycle controllers, comprising a base cam with a plurality of peripheral portions having different radii adapted to engage a single follower member for control of different events in a cycle according to the radius of the portion engaging the follower, and a shaft upon which said base cam is adapted to be mounted for rotation thereby; a plurality of annular cam sectors; means extending from the base cam radially displaced from the center thereof for removably supporting the sectors thereon in coaxial relationship with one another and with said base cam and allowing of angular adjustment with respect thereto, the said sectors having different radii corresponding to respective peripheral portions of said base cam for engaging the single follower member; and a graduated clamping plate of lesser radius than the least radius of any of the cam sectors, angularly fixed by the sector-supporting means with respect to the base cam and adapted to secure the various cam sectors thereto in adjusted positions one upon another.

6. Cam mechanism for cycle controllers, comprising a base cam with a plurality of peripheral portions having different radii adapted to engage a single follower member for control of different events in a cycle according to the radius of the portion engaging the follower, and a shaft upon which said base cam is adapted to be mounted for rotation thereby and provided with an abutment; a plurality of annular cam sectors; means extending from the base cam radially displaced from the center thereof for removably supporting the sectors thereon in coaxial relationship with one another and with said base cam and allowing of angular adjustment with respect thereto, the said sectors having different radii corresponding to respective peripheral portions of said base cam for engaging the single follower member; and graduated means of a lesser radius than the least radius of any of the cam sectors, angularly fixed by the sector-supporting means with respect to the base cam and adapted to secure the various cam sectors in adjusted positions one upon another, including means to secure the graduated means to the base cam to form therewith a unit cam member; together with a clamping nut having threaded engagement with the end of the shaft for clamping the unit cam member to said abutment of the shaft.

WILLIAM J. KERR.
CHARLES WEBBER.